United States Patent
Strobel et al.

(10) Patent No.: US 12,028,125 B2
(45) Date of Patent: Jul. 2, 2024

(54) DISTORTION-OPTIMIZED TRANSMISSION IN HYBRID FIBER COAX NETWORKS

(71) Applicant: MAXLINEAR, INC., Carlsbad, CA (US)

(72) Inventors: Rainer Strobel, Munich (DE); Thushara Hewavithana, Chandler, AZ (US)

(73) Assignee: MaxLinear, Inc., Carlsbad, CA (US)

( * ) Notice: Subject to any disclaimer, the term of this patent is extended or adjusted under 35 U.S.C. 154(b) by 373 days.

(21) Appl. No.: 17/434,383

(22) PCT Filed: Feb. 26, 2020

(86) PCT No.: PCT/US2020/019824
§ 371 (c)(1),
(2) Date: Aug. 26, 2021

(87) PCT Pub. No.: WO2020/176580
PCT Pub. Date: Sep. 3, 2020

(65) Prior Publication Data
US 2022/0149891 A1    May 12, 2022

Related U.S. Application Data (60) Provisional application No. 62/810,471, filed on Feb. 26, 2019.

(51) Int. Cl.
*H04B 3/04* (2006.01)
*H04L 5/00* (2006.01)

(52) U.S. Cl.
CPC .............. *H04B 3/04* (2013.01); *H04L 5/006* (2013.01)

(58) Field of Classification Search
CPC ... H04B 3/04; H04B 3/00; H04B 3/02; H04B 3/03; H04B 3/06; H04L 5/00; H04L 5/003; H04L 5/0032; H04L 5/006; H04L 5/0062
(Continued)

(56) References Cited

U.S. PATENT DOCUMENTS 6,334,219 B1 * 12/2001 Hill ........................ H04H 60/11
341/100
8,000,254 B2 * 8/2011 Thompson .......... H04L 43/0823
370/352
(Continued)

FOREIGN PATENT DOCUMENTS

| CN | 102474405 A | 5/2012 |
| CN | 105284068 A | 1/2016 |

OTHER PUBLICATIONS

International Search Report and Written Opinion in PCT/US2020/019824 dated Aug. 19, 2020.
(Continued)

*Primary Examiner* — Hai L Nguyen
(74) *Attorney, Agent, or Firm* — Buchalter; Jason W. Croft (57) ABSTRACT

A node circuit associated with a hybrid fiber coax (HFC) network is disclosed. The node circuit includes an optimizer circuit configured to process a plurality of signal-to-noise ratio (SNR) values associated with a plurality of subcarriers, respectively, associated with a set of cable modem (CM) circuits coupled to the node circuit. In some embodiments, at least one subcarrier is allocated to the set of CM circuits for communication with the node circuit. In some embodiments, the optimizer circuit is further configured to determine an optimal transmit power of the node circuit, based on the plurality of SNR values and a transmitter distortion of a transmitter circuit associated with the node circuit. In some
(Continued)

embodiments, the transmitter distortion defines a transmitter distortion associated with the transmitter circuit in terms of a total transmit power of the node circuit.

17 Claims, 5 Drawing Sheets

(58) Field of Classification Search
USPC .................. 333/18; 370/464, 473, 485–487; 375/257
See application file for complete search history.

(56) References Cited

U.S. PATENT DOCUMENTS

2010/0157824 A1    6/2010   Thompson
2018/0115434 A1    4/2018   Zhang et al.

OTHER PUBLICATIONS

Banelli et al. "Effects of HPA nonlinearity on frequency multiplexed OFDM signals," in IEEE Transactions on Broadcasting, vol. 47, No. 2, pp. 123-136, Jun. 2001, doi: 10.1109/11.948265.

P. Banelli, G. Baruffa and S. Cacopardi, "Effects of HPA nonlinearity on frequency multiplexed OFDM signals," in IEEE Transactions on Broadcasting, vol. 47, No. 2, pp. 123-136, Jun. 2001, doi: 10.1109/11.948265.

Examination Report in European Application No. 20715542.5 dated Jun. 2, 2023.

First Office Action in Chinese Patent Application 202080030138X dated Jan. 19, 2023.

P. Banelli et al., "Effects of HPA Non Linearity on Frequency Multiplexed OFDM Signals" IEEE Transactions on Broadcasting vol. 47 No. 2 Jun. 1, 2001.

Communication pursuant to Article 94(3) EPC for European Application No. 20715542.5, dated Nov. 6, 2023, 5 Pages.

* cited by examiner

DISTORTION-OPTIMIZED TRANSMISSION IN HYBRID FIBER COAX NETWORKS

REFERENCE TO RELATED APPLICATIONS

This application claims the benefit of provisional Application No. 62/810,471, filed Feb. 26, 2019, entitled "DISTORTION-OPTIMIZED TRANSMISSION IN HYBRID FIBER COAX NETWORKS", contents of which are herein incorporated by reference in their entirety.

FIELD

The present disclosure relates to hybrid fiber coaxial (HFC) networks, and in particular, to a system and a method that facilitates distortion optimized transmission in HFC networks.

BACKGROUND

In the coax networks, traffic requirements keep increasing and higher frequencies are used for signal transmission. In order to handle the increasing traffic requirements, the hybrid fiber coax (HFC) network is utilized. In HFC networks, in some embodiments, a distributed access architecture (DAA) is used. In DAA, a node or a node circuit is the PHY layer of a headend Cable Modem Termination System (CMTS). Node is placed deep in the network, closer to the subscribers, and CMTS core would be in a centralized location supporting multiple Remote PHY (RPHY) Nodes. Fiber connection connects RPHY Node to the CMTS core with digital fiber technology (e.g. EPON). In RPHY (or the node), the digital optical signal is fully demodulated and decoded and then remodulated to data over cable service interface specification (DOCSIS) spectrum. Multiple-System Operators (MSOs) are in the process of upgrading their HFC networks to DAA, which has many advantages, compared to traditional centralized architecture. One of the key advantages is that the fiber link adds no noise to DOCSIS signal in DAA. All noise and distortions are generated from the Cable part of the network, including the RF front end of the RPHY Node.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

In one embodiment of the disclosure, a node circuit associated with a hybrid fiber coax (HFC) network is disclosed. The node circuit comprises an optimizer circuit configured to process a plurality of signal-to-noise ratio (SNR) values associated with a plurality of subcarriers, respectively, associated with a set of cable modem (CM) circuits coupled to the node circuit. In some embodiments, the plurality of subcarriers comprises subcarriers that are allocated to the set of CM circuits for communication with the node circuit. In some embodiments, the optimizer circuit is further configured to determine an optimal transmit power of the node circuit, based on the plurality of SNR values and a distortion model of a transmitter circuit associated with the node circuit. In some embodiments, the distortion model defines a transmitter distortion associated with the transmitter circuit.

In one embodiment of the disclosure, a node circuit associated with a hybrid fiber coax (HFC) network is disclosed. The node circuit comprises a processing circuit configured to allocate a plurality of subcarriers to a set of CM circuits coupled to the node circuit, wherein the plurality of subcarriers is allocated based on a frequency of the plurality of subcarriers, in accordance with a distance of the set of CM circuits from the node circuit. In some embodiments, the node circuit further comprises an optimizer circuit configured to determine an optimal transmit power of the node circuit, based on a plurality of SNR values associated with the plurality of subcarriers, respectively and a distortion model of a transmitter circuit associated with the node circuit. In some embodiments, the distortion model defines a transmitter distortion associated with the transmitter circuit.

In one embodiment of the disclosure, a cable modem termination system (CMTS) circuit associated with a hybrid fiber coax (HFC) network is disclosed. In some embodiments, the CMTS circuit is configured to couple to a node circuit over fiber. In some embodiments, the CMTS circuit comprises a memory configured to store a plurality of instructions; and one or more processors configured to retrieve the plurality of instructions from the memory. In some embodiments, upon execution of the plurality of instructions, the one or more processors is configured to process a plurality of signal-to-noise ratio (SNR) values associated with a plurality of subcarriers, respectively, associated with a set of cable modem (CM) circuits coupled to the node circuit. In some embodiments, the plurality of subcarriers comprises subcarriers that are allocated to the set of CM circuits for communication with the node circuit. In some embodiments, the one or more processors is further configured to determine an optimal transmit power of the node circuit, based on the plurality of SNR values and a distortion model of a transmitter circuit associated with the node circuit. In some embodiments, the distortion model defines a transmitter distortion associated with the transmitter circuit.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

As indicated above, the fiber link in HFC networks adds no noise to DOCSIS signal in distributed access architecture (DAA). All noise and distortions are generated from the Cable part (i.e., the cox cables) of the network, including the radio frequency (RF) front end of the RPHY Node. For the frequencies up to 1.2 GHz currently used for data transmission in the HFC network, in some embodiments, the attenuation between the node and the cable modem (CM) is kept approximately constant for each CM and for each subcarrier associated therewith. This is achieved by using different coupling attenuation in the taps with more attenuation for taps close to the node and lower attenuation for the following taps, which experience higher attenuation of the trunk cable (i.e., the coax cables) and the insertion loss of the previous taps. When using higher frequencies, e.g., 3 GHz, equal power for each CM is difficult to achieve, because the attenuation of the trunk cable is frequency dependent and higher frequencies on long lines experience a much higher attenuation that cannot be fully compensated. This results in a wide spread of signal-to-noise ratio (SNR) over the different CMs.

Further, on channels with lower attenuation, the achievable signal-to-noise ratio (SNR) and thus, the data rate is limited by transmitter distortion (in particular, distortion of a power amplifier (PA) associated therewith) and on channels with higher attenuation, the SNR is limited by the receiver noise floor. In some embodiments, the transmitter distortion increases with increasing transmit power which causes data rates to be limited by transmitter distortion. From a receiver noise perspective, increasing transmit power increases the SNR. There is a trade-off between transmitter distortion and receiver noise that gives the highest possible data rates. The optimal trade-off between the transmitter distortion and the receiver noise depends on the transmit power of the node circuit which can be adjusted, depending on the noise conditions. In particular, there is an optimal transmit power for the node circuit that gives the best possible data rates for one or more CM circuits associated therewith.

The optimal transmit power is different for each cable modem because of different channel attenuation for each CM. In particular, each CM is associated with a set of subcarriers or channels, and each subcarrier of the set of subcarriers has a transmit power associated therewith. Furthermore, point-to-multipoint transmission is used in the HFC network and thus, different cable modems share the same transmit power budget. Current implementations of node circuit utilize equal transmit power levels for each of the subcarriers associated with one or more CM circuits coupled to the node circuit, such that a total transmit power $P_{sum}$ of the node circuit does not exceed a maximum transmit power budget $P_{max}$ (that may be predefined) of the node circuit. However, increasing the total transmit power $P_{sum}$ of the node circuit to the maximum transmit power budget $P_{max}$ may not give maximum data rates/capacity, due to the transmitter distortion. Specifically, for the power amplifiers used within the transmitter, the distortion increases with increasing transmit power, which leads to an optimal transmit power $P_{opt}$, which is not necessarily the highest power, $p_{max}$, giving the maximum capacity/data rates. In some embodiments, the optimal transmit power $P_{opt}$ comprises an optimal value of the total transmit power $P_{sum}$ of the node circuit that gives the maximum capacity/data rates. In terms of data rate, transmitter distortion leads to a channel where the data rate does not increase arbitrarily with increasing transmit power, but there is a maximum transmit power where data rates start decreasing when the optimal transmit power $P_{opt}$ is exceeded. However, the current implementations do not take into account the transmitter distortion when determining the transmit power levels for each of the subcarriers associated with one or more CM circuits coupled to the node circuit, thereby resulting in less than optimal data rates for the one or more CM circuits.

In order to overcome the above disadvantages, a system and a method for a node circuit that determines an optimal transmit power $P_{opt}$ of the node circuit is proposed herein. In particular, in one embodiment, a node circuit configured to determine the optimal transmit power $P_{opt}$, based on a receiver noise and a distortion model of a transmitter circuit associated with the node circuit is proposed. In some embodiments, the receiver noise comprises a noise injected by a receiver (sometimes referred to as a receiver injected noise). In some embodiments, the distortion model defines a transmitter distortion associated with the transmitter circuit. In some embodiments, the receiver noise is derived based on SNR values associated with a plurality of subcarriers allocated to one or more CMs associated therewith. In some embodiments, the optimal transmit power $P_{opt}$ of the node circuit is determined based on determining an optimal transmit power spectrum comprising a plurality of optimal subcarrier transmit powers respectively associated with the plurality of subcarriers allocated to the one or more CMs associated therewith, based on the receiver noise and the distortion model of the transmitter circuit. In another embodiment, a system and a method for a node circuit that allocates the plurality of subcarriers to the one or more CM circuits coupled to the node circuit is proposed. In some embodiments, the plurality of subcarriers is allocated to the one or more CM circuits based on a frequency of the plurality of subcarriers, in accordance with a distance of the one or more CM circuits from the node circuit.

In some embodiments, the proposed system and method to determine the optimal transmit power $P_{opt}$ achieves higher data rates, especially on lines with higher attenuation. In addition, on subcarriers where the SNR exceeds the required SNR value that is used to transmit at the highest data rate, the power can be reduced to increase transmit power on other subcarriers with lower SNR. Similarly, on subcarriers where the SNR is below the minimum SNR required for transmission, no signal is transmitted to save power. With that, in some embodiments, the limited capacity of the cable network is used more efficiently and a fair data rate distribution among the cable modems is achieved even though, the attenuation towards each CM is not equalized in the passive network components (i.e., the tap circuits).

Figure 1:
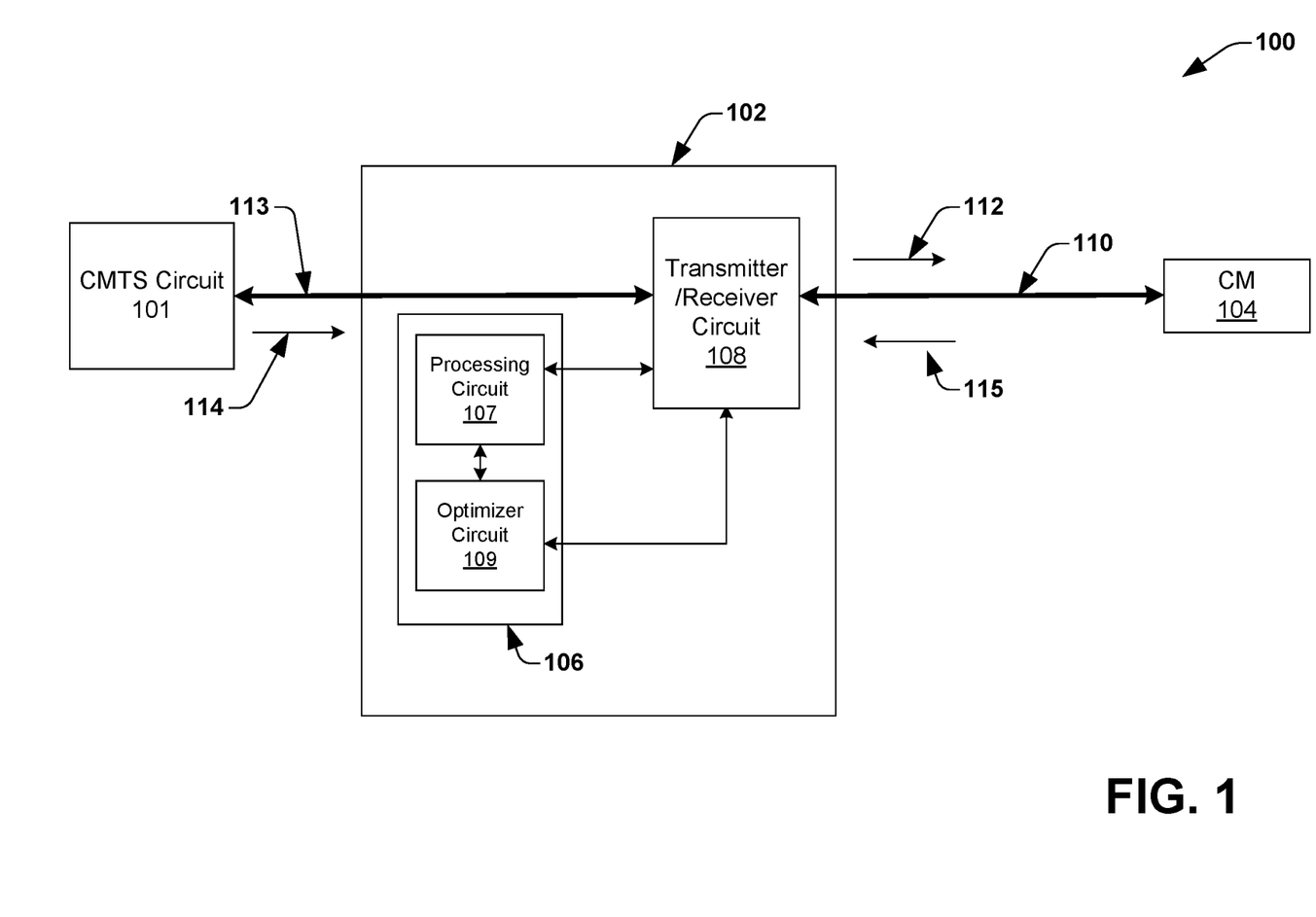
FIG. 1 illustrates a simplified block diagram of a hybrid fiber coax (HFC) network, according to one embodiment of the disclosure.

FIG. 1 illustrates a simplified block diagram of a hybrid fiber coax (HFC) network 100, according to one embodiment of the disclosure. The HFC network 100 comprises a cable modem termination system (CMTS) circuit 101, a node circuit 102 and a cable modem (CM) circuit 104. In some embodiments, the CM circuit 104 comprises a set of CM circuits comprising one or more CM circuits. In some embodiments, the node circuit 102 is configured to couple to the CM circuit 104 over a transmission link 110 at a first end. In some embodiments, the transmission link 110 comprises coaxial cables. In some embodiments, the node circuit 102 is further configured to couple to the CMTS circuit 101 at a second, different, end. In some embodiments, the CMTS circuit 101 comprises a transceiver or a communication device that is located at a head end or a central office of the HFC network 100. In some embodiments, the node circuit 102 is configured to couple to the CMTS circuit 101 over a fiber link 113 comprising one or more fiber optic cables. In some embodiments, the node circuit 102 comprises a transceiver or a communication device that is located away from the head end (closer to the subscribers). In this embodiment, the node circuit 102 is shown to be coupled to the CM circuit 104 directly over the transmission link 110. However, in other embodiments, the node circuit 102 may be configured to couple to the CM circuit 104 indirectly, via other node circuits over the transmission link 110. In the embodiments described throughout the disclosure, the term coupled may refer to both directly coupled or indirectly coupled.

In some embodiments, the node circuit 102 comprises one or more transceivers/processors configured to amplify/process data signals. In particular, in some embodiments, the node circuit 102 comprises one or more processors 106 and a transmitter/receiver circuit 108. In addition, although not shown here, in some embodiments, the node circuit 102 may further comprise a memory circuit. In some embodiments, the one or more processors 106 comprise a processing circuit 107 and an optimizer circuit 109. In some embodiments, the processing circuit 107 is configured to provide a set of downstream data signals 112 to the set of CM circuits 104, respectively, over the transmission link 110, via the transmitter/receiver circuit 108. In some embodiments, the processing circuit 107 is configured to provide the set of downstream data signals 112 to the set of CM circuits 104, respectively, over the transmission link 110, using a plurality of subcarriers that is allocated to the set of CM circuits 104 for communication with the node circuit 102. In some embodiments, the set of downstream data signals 112 is derived/generated at the processing circuit 107, based on a set of downstream data signals 114 received from the CMTS circuit 101.

Prior to providing the set of downstream data signals 112 to the set of CM circuits 104 using the plurality of subcarriers, in some embodiments, the processing circuit 107 is further configured to determine an optimal transmit power $P_{opt}$ of the node circuit 102 to be utilized to transmit the set of downstream data signals 112 using the set of subcarriers. In some embodiments, the optimal transmit power $P_{opt}$ comprises an optimal value of a total transmit power $P_{sum}$ of the node circuit 102 that maximizes capacity/data rates of the plurality of subcarriers. In some embodiments, the total transmit power $P_{sum}$ of the node circuit 102 comprises a sum of a set of subcarrier transmit powers, respectively associated with the set of subcarriers allocated to the set of CM circuits 104. In some embodiments, the optimal transmit power $P_{opt}$ of the node circuit 102 is determined using the optimizer circuit 109 coupled to the processing circuit 107. In some embodiments, the optimal transmit power $P_{opt}$ is determined in a way that data rates associated with each of the plurality of subcarriers is maximized. In some embodiments, the optimal transmit power $P_{opt}$ may be different from a maximum power budget $P_{max}$ of the node circuit 102. In some embodiments, the optimal transmit power $P_{opt}$ of the node circuit 102 is determined based on an information of a dependency between the total transmit power $P_{sum}$ associated with the node circuit 102 and a transmitter distortion associated with the node circuit 102. In some embodiments, the transmitter distortion associated with the node circuit 102 increases with increasing transmit power $P_{sum}$.

In some embodiments, the optimal transmit power $P_{opt}$ of the node circuit 102 is determined at the optimizer circuit 109 based on a predefined optimal channel capacity relation (details of which are given below) that is derived in accordance with a receiver noise (i.e., a receiver injected noise associated with the plurality of subcarriers associated with the set of CM circuits 104) and a distortion model of a transmitter circuit (included within the transmitter/Receiver circuit 108) associated with the node circuit 102. In some embodiments, the distortion model defines a transmitter distortion/noise associated with the transmitter circuit. In some embodiments, the distortion model defines the transmitter distortion in terms of the total transmit power $P_{sum}$ of the node circuit. In some embodiments, the predefined optimal channel capacity relation defines an upper limit of the data rates for the node circuit 102.

In some embodiments, the optimizer circuit 109 is configured to process a plurality of signal-to-noise ratio (SNR) values 115 associated with the plurality of subcarriers, respectively, associated with the set of cable modem (CM) circuits 104, in order to determine the optimal transmit power $P_{opt}$. In particular, in some embodiments, the optimizer circuit 109 is configured to determine the receiver noise, based on the plurality of SNR values 115 and the distortion model of the transmitter circuit. In some embodiments, the plurality of SNR values 115 is received at the optimizer circuit 109, based on providing one or more test signals to the set of CM circuits 104 over the plurality of subcarriers. In particular, in some embodiments, the receiver noise associated with each of the subcarriers is determined based on a transmit power of the test signal on a subcarrier, the SNR value of the corresponding subcarrier and the distortion model of the transmitter circuit. Therefore, in some embodiments, the optimizer circuit 109 is configured to determine the optimal transmit power of the node circuit 102, based on the plurality of SNR values 115 and the predefined optimal channel capacity relation that is derived in accordance with the distortion model of the transmitter circuit associated with the node circuit 102.

The predefined optimal channel capacity relation and the determination of the optimal transmit power $P_{opt}$ is derived in some embodiments, as will be fully appreciated below. In some embodiments, orthogonal frequency division multiplexing (OFDM) multicarrier transmission is used in the HFC network 100. Therefore, a communication channel between the node circuit 102 and the CM circuit 104 can be modeled by K independent narrowband channels or subcarriers k=1, ..., K with bandwidth $\Delta f$, e.g., $\Delta f$=50 kHz. In some embodiments, there is a channel coefficient $H^{(k)}$ associated with each subcarrier, describing attenuation and phase of the channel at frequency $f=k\Delta f$. A subcarrier transmit power comprising the transmit power on each subcarrier k is $x^{(k)}$ and the noise variance associated with each subcarrier k is $\sigma^{(k),2}$. In some embodiments, the noise variance $\sigma^{(k),2}$ corresponds to a total noise associated with each subcarrier at the receiver. In some embodiments, the total noise at the receiver comprises a receiver injected noise (i.e., the receiver noise) and a transmitter injected noise. This gives the SNR on subcarrier k to be $$SNR^{(k)} = \frac{|H^{(k)}|^2 x^{(k)}}{\sigma^{(k),2}} \quad (1)$$

With additive white Gaussian noise (AWGN), transmit power optimized channel capacity C is given by $$C = \max_{x_l^{(k)}} \Sigma_k \log_2\left(1 + \frac{|H^{(k)}|^2 x^{(k)}}{\Gamma \sigma^{(k),2}}\right) \quad (2)$$

-continued
$$\text{s.t. } \Sigma_k x^{(k)} \leq p_{max}$$
$$\text{s.t. } x^{(k)} \geq 0$$

Where the total transmit power $$p_{sum} = \sum_k x^{(k)}$$

is constrained to be below $p_{max}$. In some embodiments, $p_{sum}$ is a total transmit power of the node circuit 102. In some embodiments, $p_{max}$ is a maximum transmit power of a node circuit (e.g., the node circuit 102) based on the power budget of the node circuit. The SNR gap r is introduced to consider the fact that practical coding schemes require a higher SNR to achieve the target bit error rate and the fact that the modulation format used is not Gaussian, which would be optimal for the AWGN channel. In other words, the SNR gap r is introduced to account for the decoder imperfections related SNR gap to the Shannon Capacity.

Besides the SNR gap, practical coding and modulation systems use a set of constellations, e.g., between 4 bit and 12 bit constellations. Thus, the achievable data rate is a discrete function, upper bounded by the capacity C. But with a sufficiently small SNR steps between the constellation sizes, and when considering the SNR required for the minimum constellation $SNR_{min}$ and the SNR required for the largest constellation $SNR_{max}$, the power values maximizing capacity also maximize data rate. Putting the SNR upper bound into the transmit power optimized channel capacity gives $$C = \max_{x_l^{(k)}} \Sigma_k \log_2\left(1 + \frac{|H^{(k)}|^2 x^{(k)}}{\Gamma \sigma^{(k),2}}\right) \quad (3)$$
$$\text{s.t. } \Sigma_k x^{(k)} \leq p_{max}$$
$$\text{s.t. } x^{(k)} \leq p_{mask}^{(k)}$$
$$\text{s.t. } x^{(k)} \geq 0$$

where $p_{mask}^{(k)}$ is selected to keep the SNR of each of the subcarriers below a predefined maximum subcarrier SNR, $SNR_{max}$, e.g., $p_{mask}^{(k)} = SNR_{max} \sigma^{(k),2}$. In some embodiments, $p_{mask}^{(k)}$ comprises a predefined maximum subcarrier transmit power associated with each of the subcarriers k.

In some embodiments, the channel capacity equations in equation (2) and (3) are defined to find subcarrier transmit power values $x^{(k)}$ for each of the subcarriers k that maximizes the channel capacity/data rates for the subcarriers k. In some embodiments, the subcarrier transmit powers $x^{(k)}$ are determined from equations (2) and (3) in a way that, the total transmit power $$p_{sum} = \sum_k x^{(k)}$$

of the node circuit 104 does not exceed the maximum transmit power $p_{max}$ of the node circuit 104. However, determining the subcarrier transmit powers $x^{(k)}$ based on the maximum transmit power $p_{max}$, may not provide the best possible data rates for the channels, due to transmitter distortion. In particular, in some embodiments, transmitter distortion leads to a channel where the data rate does not increase arbitrarily with increasing the total transmit power $p_{sum}$ to the maximum transmit power $p_{max}$. Rather, in some embodiments, the data rates start decreasing when the optimal transmit power $P_{opt}$ is exceeded.

Specifically, the transmitter distortion increases with increasing the total transmit power $p_{sum}$ which leads to the optimal transmit power $P_{opt}$, which is not necessarily the maximum transmit power, $p_{max}$, giving the maximum capacity/data rates. Therefore, it is essential to perform power optimization comprising determining the optimal transmit power $P_{opt}$, of the node circuit 102, in order to get the best possible data rates (or maximize the data rates) for each of the subcarriers k. In a multicarrier system, the transmitter distortion can be measured by the missing tone power ratio MTPR, which is the ratio between signal level and distortion level where the distortion is measured as the signal level received on a subcarrier, when zero power is transmitted on this subcarrier, while the other subcarriers are transmitted at the regular power level. In some embodiments, the transmitter distortion is approximately flat in frequency at the transmitter (TX) output and to model the transmitter distortion seen at the CM circuit 104 at the other end of Coax link 110, with the heavy down-tilt of Coax channel, a frequency-dependent distortion variance $\sigma_d^{(k)2}$ that corresponds to the transmitter injected noise/distortion is introduced. In particular, noise variance $\sigma^{(k),2}$ in equation (1) is separated into a receiver noise variance $\sigma_r^{k,2}$ and the frequency dependent distortion variance $\sigma_d^{(k)2}$. In some embodiments, the receiver noise variance $\sigma_r^{k,2}$ corresponds to the receiver injected noise. Therefore, in some embodiments, the SNR with distortion is modeled by $$SNR^{(k)} = \frac{|H^{(k)}|^2 x^{(k)}}{\sigma_r^{k,2} + \sigma_d^{(k)2}} = \frac{|H^{(k)}|^2 x^{(k)}}{\sigma_r^{k,2} + \delta^{(k)} p_{sum}^\alpha} \quad (4)$$

with the sum distortion described by $\delta p_{sum}^\alpha$ and $$\delta^{(k)} = \frac{\delta}{K}|H^{(k)}|^2,$$

thus $\sigma_d^{(k)2} = \delta^{(k)} p_{sum}^\alpha$. In some embodiments, the frequency-dependent distortion variance $\sigma_d^{(k)2} = \delta^{(k)} p_{sum}^\alpha$ comprises the distortion model of the transmitter circuit. In some embodiments, since the transmitter distortion increases with increasing total transmit power $p_{sum}$, the distortion model $\sigma_d^{(k)2}$ is defined in terms of $p_{sum}$, the total transmit power of the node circuit 102. In other words, the distortion model $\sigma_d^{(k)2}$ models the transmitter distortion as a power dependent noise source. In some embodiments, $\delta$ is predefined. In some embodiments, $\delta$ is derived based on the missing tone power ratio MTPR. In some embodiments, $\alpha$ describes the scale at which the transmitter distortion increases more than the total transmit power $p_{sum}$. In some embodiments, $\alpha=2$. It is hereby noted that the approximation is accurate for a certain TX power range, e.g., up to 25 dBm, in one example. In one embodiment, this is resolved by using a higher order polynomial (e.g., $\delta_2^{(k)} p_{sum}^2 + \delta_3^{(k)} p_{sum}^3 + \ldots$). In another embodiment, the total transmit power $p_{sum}$ is not allowed to exceed the power level where the approximation starts to be inaccurate, e.g., don't allow transmit power higher than 25 dBm. Alternately, other values of a may be utilized in other embodiments.

In order to find the optimal transmit power $P_{opt}$ that gives the optimal data rates, in some embodiments, the channel capacity equation in equation (3) above is modified to account for the transmitter distortion. In particular, the total transmit power constraint is removed from equation (3) and the noise variance $\sigma^{(k),2}$ in equation (3) is separated into the receiver noise variance $\sigma_r^{k,2}$ and the frequency dependent distortion variance $\sigma_d^{(k)2}$. This gives the optimization problem $$C = \max_{x^{(k)}} \Sigma_k \log_2\left(1 + \frac{|H^{(k)}|^2 x^{(k)}}{\Gamma(\sigma_r^{k,2} + \delta^{(k)} p_{sum}^\alpha)}\right) \quad (5)$$

$$\text{s.t. } x^{(k)} \leq p_{mask}^{(k)}$$

$$\text{s.t. } x^{(k)} \geq 0$$

In some embodiments, the equation (5) comprises the predefined optimal channel capacity relation. As can be seen above in equation (5), the predefined optimal channel capacity relation is defined in accordance with the distortion model $\sigma_d^{(k)2} = \delta^{(k)} p_{sum}^\alpha$. In some embodiments, $p_{sum}$ is a total transmit power of the node circuit 102, $|H^{(k)}|$ is the channel coefficient, $\Gamma$ is the SNR gap to Shannon capacity, $\sigma_r^{k,2}$ is the receiver noise variance and $$\delta^{(k)} = \frac{\delta}{K}|H^{(k)}|^2.$$

In some embodiments, the values of $|H^{(k)}|$, $\Gamma$ are known to the node circuit 102 (e.g., estimated/predefined at the node circuit 102 or estimated at the CM circuit 104 and communicated to the node circuit 102). In some embodiments, channel estimate, $|H^{(k)}|$, for subcarriers are calculated at a CM (e.g, the set of CM circuits 104 in FIG. 1) as part of demodulation of OFDM sub-carriers. In such embodiments, the CMTS can request CMs to report these channel estimates back to the Node/CMTS to be used in the power optimization process. In some embodiments, the receiver noise variance $\sigma_r^{k,2}$ is estimated at the optimizer circuit 109 using equation (4), based on the plurality of SNR values 115 and the distortion model $\sigma_d^{(k)2}$ of the transmitter circuit.

In some embodiments, solving equation (5) above gives optimal subcarrier transmit power values $x_{opt}^{(k)}$ for each of the k subcarriers that maximizes data rates on the corresponding subcarriers. In some embodiments, optimal subcarrier transmit power values $x_{opt}^{(k)}$ is determined based on solving for $x^{(k)}$ in equation (5) above. Further, the optimal transmit power $P_{opt}$ may be determined based on a sum of the optimal subcarrier transmit power values $x_{opt}^{(k)}$. In some embodiments, the optimizer circuit 109 is configured to solve the equation (5). Upon solving the equation (5), in some embodiments, the optimizer circuit 109 is configured to determine an optimal transmit spectrum comprising a plurality of optimal subcarrier transmit power values $x_{opt}^{(k)}$ associated with the plurality of subcarriers k=1, 2 . . . K. In addition, in some embodiments, the optimizer circuit 109 is further configured to determine the optimal transmit power, $p_{opt}$, based on the determined plurality of subcarrier transmit powers values $x_{opt}^{(k)}$. In particular, in some embodiments, $p_{opt} = \Sigma_k x_{opt}^{(k)}$, where $x_{opt}^{(k)}$ comprises the determined plurality of optimal subcarrier transmit power values.

Upon determining the optimal transmit power $p_{opt}$ and the plurality of optimal subcarrier transmit power values $x_{opt}^{(k)}$, in some embodiments, the optimizer circuit 109 is further configured to determine a bit allocation comprising a plurality of data rates associated with the plurality of subcarriers k, respectively, based on the predefined optimal channel capacity relation (equation (5), in accordance with the determined optimal transmit power $p_{opt}$ and the determined optimal transmit power spectrum. In particular, the data rate associated with each subcarrier is determined based on the following relation within equation (5):

$$D_{(k)} = \log_2\left(1 + \frac{|H^{(k)}|^2 x^{(k)}}{\Gamma\left(\sigma_r^{k,2} + \delta^{(k)} p_{sum}^2\right)}\right) \quad (6)$$

Where $D_{(k)}$ is the data rate for a subcarrier k. In some embodiments, equation (6) is referred to as a predefined data rate relation. In some embodiments, by substituting the determined optimal transmit power $p_{opt}$ as $p_{sum}$ and the plurality of optimal subcarrier transmit power values $x_{opt}^{(k)}$ in equation (6), the bit allocation can be determined at the optimizer circuit 109.

In order to solve the equation (5) within the optimizer circuit 109, in some embodiments, an iterative procedure is used. In particular, in one embodiment, a gradient method is used. However, other methods for solving the equation (5) are also contemplated to be within the scope of this disclosure. In the gradient method, a gradient is utilized to determine the plurality of subcarrier transmit powers values $x_{opt}^{(k)}$. In some embodiments, the gradient is derived based on the predefined optimal channel capacity relation as given below:

$$\frac{dC}{dx^{(k)}} = \frac{|H^{(k)}|^2}{\left(\sigma_r^{k,2} + \delta^{(k)}\left(p_{sum(x(k))}\right)^\alpha\right)(\Gamma + SNR^{(k)})} - \sum_{d=1}^{K} \frac{|H^{(d)}|^2 x^{(d)} \alpha \delta^{(d)}\left(p_{sum(x(k))}\right)^{\alpha-1}}{\left(\sigma_r^{d,2} + \delta^{(d)}\left(p_{sum(x(k))}\right)^\alpha\right)^2 (\Gamma + SNR^{(d)})} \quad (7)$$

In particular, the gradient (7) is derived based on taking a derivative of the predefined optimal channel capacity relation in equation (5) above, with respect to the subcarrier transmit power $x^{(k)}$ and reducing the equation in terms of the SNR relation in equation (4) above.

Using the equation (7) above, in some embodiments, a gradient value for each of the subcarriers k is determined at the optimizer circuit 109. In some embodiments, the gradient value is determined based on utilizing previous values of $x^{(k)}$ and $p_{sum}$ (e.g., at a previous iteration). Upon determining the gradient, in some embodiments, the optimizer circuit 109 is further configured to determine the plurality of optimal subcarrier transmit power values $x_{opt}^{(k)}$ based on the following equation:

$$x_{t+1}^{(k)} = \min\left(\max\left(x_t^{(k)} + \rho\frac{dC}{dx^{(k)}}, 0\right) p_{mask}^{(k)}\right) \quad (8)$$

Where $x_t^{(k)}$ is the subcarrier transmit power associated with the subcarrier k at a previous iteration, $x_{t+1}^{(k)}$ is the optimal subcarrier transmit power $x_{opt}^{(k)}$ associated with the subcarrier k at the current iteration and p is a step size comprising a small positive value. In some embodiments, optimal subcarrier transmit power $x_{t+1}^{(k)}$ associated with each of the subcarriers k is determined in a way that a predefined maximum subcarrier transmit power for each subcarrier, $p_{mask}^{(k)}$ is not exceeded.

In some embodiments, the power optimization procedure explained above, that is, determining the optimal transmit spectrum comprising a plurality of optimal subcarrier transmit powers values $x_{opt}^{(k)}$, determining the optimal transmit power, $p_{opt}$ and determining the bit allocation is performed within the node circuit 102. Alternately, in some embodiments, the above power optimization procedure may be performed using one or more processors within the CMTS circuit 101. Therefore in such embodiments, the CMTS circuit 101 may be configured to determine the plurality of optimal subcarrier transmit powers values $x_{opt}^{(k)}$, the optimal transmit power, $P_{opt}$ and the bit allocation, based on the plurality of SNR values 115 and the distortion model $\sigma_d^{(k)2}$ of the transmitter circuit associated with the node circuit 102, as explained above with respect to the optimizer circuit 109. In such embodiments, the node circuit 102 is configured to provide the plurality of SNR values 115 associated with the set of CM circuits 104 to the CMTS circuit 101. Upon determining the above parameters/values, in some embodiments, the CMTS circuit 101 is further configured to provide/forward the determined parameters/values to the node circuit 102.

Referring back to FIG. 1, upon determining the plurality of optimal subcarrier transmit power values $x_{opt}^{(k)}$ and the optimal transmit power, $p_{opt}$, in some embodiments, the processing circuit 107 is configured to provide the set of downstream data signals 112 to the set of CM circuits 104, based on the determined power values. In some embodiments, prior to determining the optimal transmit power $p_{opt}$, and providing the set of downstream data signals 112 to the set of CM circuits 104, in some embodiments, the processing circuit 107 is configured to perform resource allocation comprising allocating the plurality of subcarriers to the set of CM circuits 104. In some embodiments, the plurality of subcarriers is allocated to the set of CM circuits 104, based on a frequency of the plurality of subcarriers, in accordance with a distance of the set of CM circuits from the node circuit 102. Since attenuation of coax cables is frequency dependent, higher frequencies on long cables results in much higher attenuation. Therefore, allocating higher frequencies to nearby cable modems (i.e., short lines or short cable length) and allocating lower frequencies to farther away cable modems (i.e., long lines or long cable length) enables to get optimal attenuation on all the lines associated with the node circuit 102, in some embodiments. For example, in one embodiment, the processing circuit 107 is configured to allocate a first set of subcarriers having a first set of frequencies, respectively, to a first CM circuit of the set of CM circuits 104, and a second set of subcarriers having a second set of frequencies, respectively, to a second, different, CM circuit of the set of CM circuits 104. In some embodiments, the first set of frequencies belongs to a higher frequency range relative to the second set of frequencies and the first CM circuit is located closer to the node circuit with respect to the second CM circuit.

In some embodiments, the resource allocation procedure explained above is performed within the node circuit 102. Alternately, in other embodiments, the resource allocation procedure explained above is performed within the CMTS circuit 101 in FIG. 1. In such embodiments, the CMTS circuit 101 is configured to allocate the plurality of subcarriers to set of CM circuits 104 coupled to the node circuit 102, based on the frequency of the plurality of subcarriers, in accordance with a distance of the set of CM circuits 104 from the node circuit 102 or the CMTS circuit 101.

Figure 2:
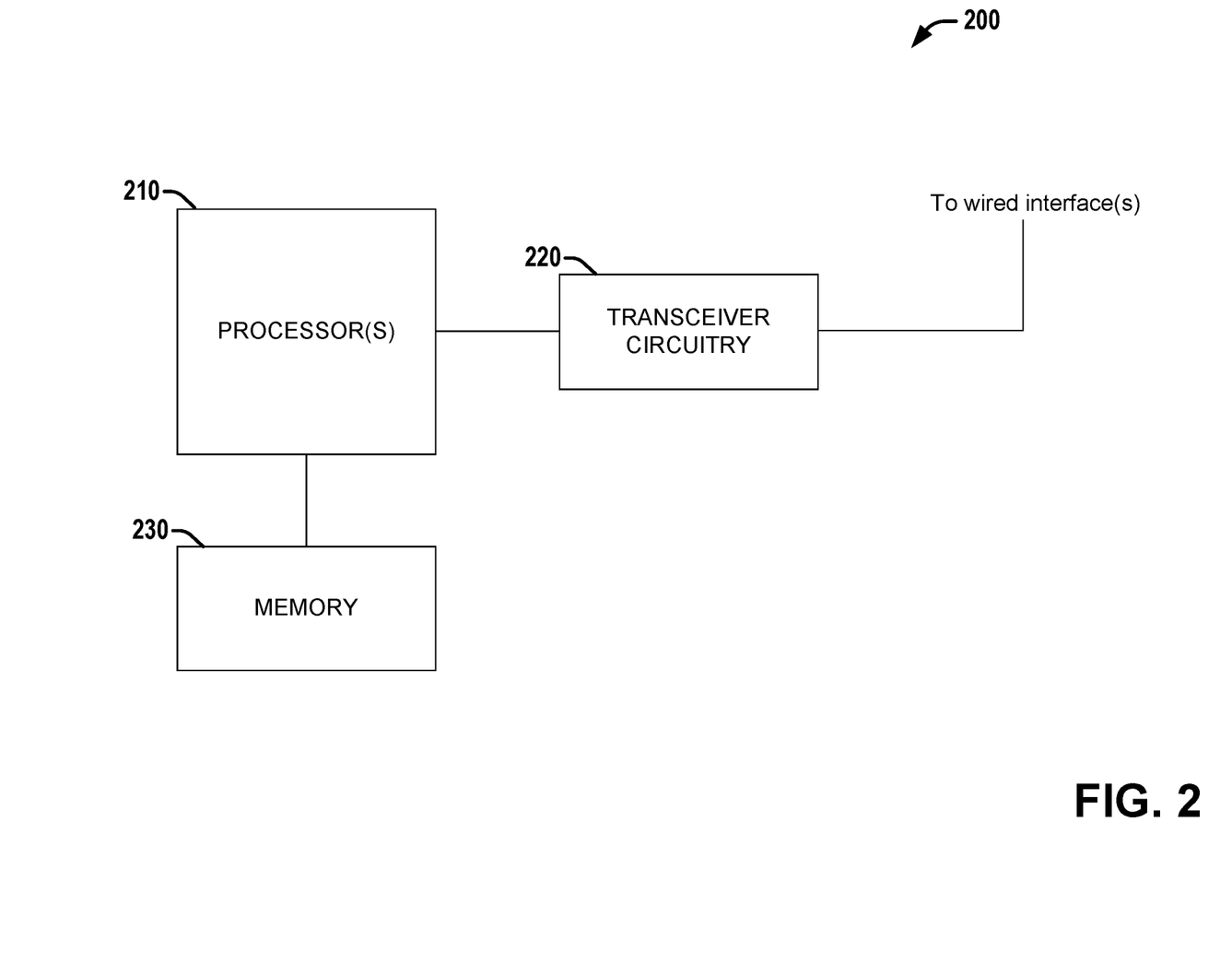
FIG. 2 illustrates a simplified block diagram of an apparatus for a device associated with a wireline communication system, according to various embodiments described herein.

FIG. 2 illustrates a simplified block diagram of an apparatus 200 for a device associated with a wireline communication system, according to various embodiments described herein. In some embodiments, the apparatus 200 may be included within the CMTS circuit 101 in FIG. 1. Further, in some embodiments, the apparatus 200 may be included within the node circuit 102 in FIG. 1. The apparatus 200 includes a processing circuit 210, a transceiver circuit 220 (which can facilitate communication of data via one or more networks in some aspects) and a memory circuit 230 (which can comprise any of a variety of storage mediums and can store instructions and/or data associated with at least one of the processor 210 or transceiver circuitry 220). In some embodiments, the transceiver circuit 220 may comprise one or more transceiver circuits. In some embodiments, the transceiver circuit 220 may include, inter alia, down-mixers, modulators/demodulators, filters, and A/D converters to convert the high frequency upstream communication to digital data, such as baseband data for example. Further, in some embodiments, the transceiver circuit 220 may include, inter alia, up-mixers, modulators/demodulators, filters, amplifiers and D/A converters to convert digital data, such as baseband data for example, to high frequency downstream communication.

In one embodiment, the transceiver circuitry 220 passes the digital data to the processing circuit 210. However, in other embodiments, the A/D conversion and the D/A conversion may take place within the processing circuit 210. In some embodiments, the transceiver circuit 220 can comprise a receiver circuit and a transmitter circuit. In some embodiments, the processing circuit 210 can include one or more processors. In some embodiments, the one or more processors can be integrated on a single chip. However, in other embodiments, the one or more processors can be embedded on different chips. In some embodiments, the memory circuit 230 comprises a computer readable storage device that includes instructions to be executed by the processor 210. In some embodiments, the memory circuit 230 can be an independent circuit and in other embodiments, the memory circuit 230 can be integrated on chip with the processor 210. Alternately, in other embodiments, the instructions to be executed by the processor 210 can be stored on a non-transitory storage medium like ROM, flash drive etc., and can be downloaded to the memory circuit 230 for execution. In some embodiments, the memory circuit 230 can comprise one or more memory circuits. In some embodiments, the one or more memory circuits can be integrated on a single chip. However, in other embodiments, the one or more memory circuits can be embedded on different chips.

Figure 3:
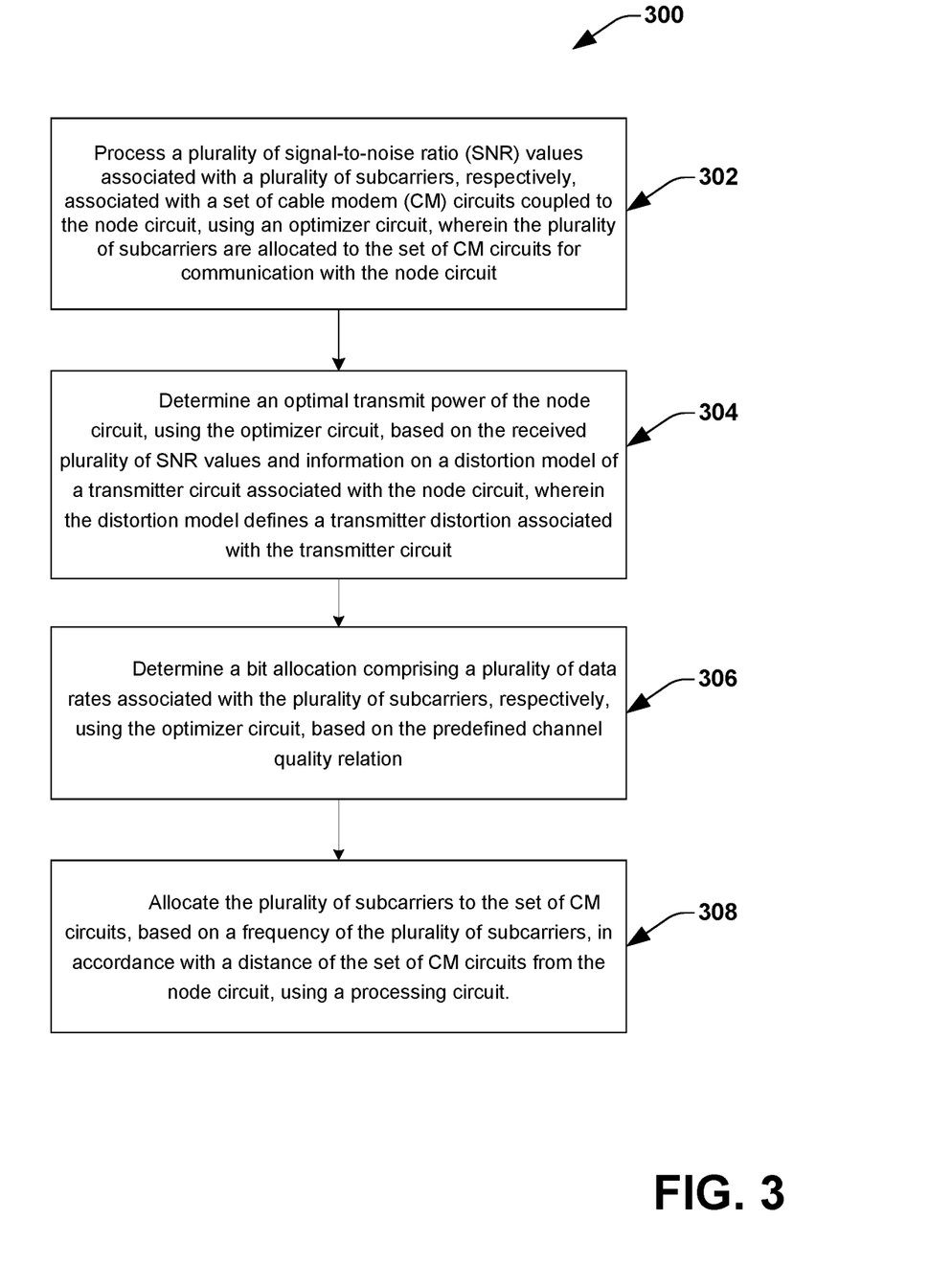
FIG. 3 illustrates a flow chart of a method of a node circuit associated with an HFC network, according to one embodiment of the disclosure.

FIG. 3 illustrates a flow chart of a method 300 of a node circuit associated with an HFC network, according to one embodiment of the disclosure. In some embodiments, the method 300 can be implemented within the node circuit 102 in FIG. 1. Therefore, the method 300 is explained herein with reference to the node circuit 102 in FIG. 1. At 302, a plurality of signal-to-noise ratio (SNR) values (e.g., the plurality of SNR values 115 in FIG. 1) associated with a plurality of subcarriers, respectively, associated with a set of cable modem (CM) circuits (e.g., the set of CM circuits 104 in FIG. 1) coupled to the node circuit (e.g., the node circuit 102 in FIG. 1), is processed using an optimizer circuit (e.g., the optimizer circuit 109 in FIG. 1). In some embodiments, the plurality of subcarriers is allocated to the set of CM circuits for communication with the node circuit.

At 304, an optimal transmit power of the node circuit is determined using the optimizer circuit, based on the received plurality of SNR values and a distortion model of a transmitter circuit associated with the node circuit (e.g., based on the predefined optimal channel capacity relation in equation (5)). In some embodiments, the distortion model defines a transmitter distortion associated with the transmitter circuit. In some embodiments, the optimal transmit power of the node circuit is determined based on determining an optimal transmit power spectrum comprising a plurality of optimal subcarrier transmit power values respectively associated with the plurality of subcarriers (e.g., the plurality of optimal subcarrier transmit power values $x_{opt}^{(k)}$), based on the plurality of SNR values and the predefined optimal channel capacity relation. At 306, a bit allocation comprising a plurality of data rates associated with the plurality of subcarriers, respectively, is determined using the optimizer circuit, based on the predefined optimal channel capacity relation (in particular, based on the predefined data rate relation in equation (6) above). At 308, the plurality of subcarriers is allocated to the set of CM circuits, based on a frequency of the plurality of subcarriers, in accordance with a distance of the set of CM circuits from the node circuit, using a processing circuit.

Figure 4:
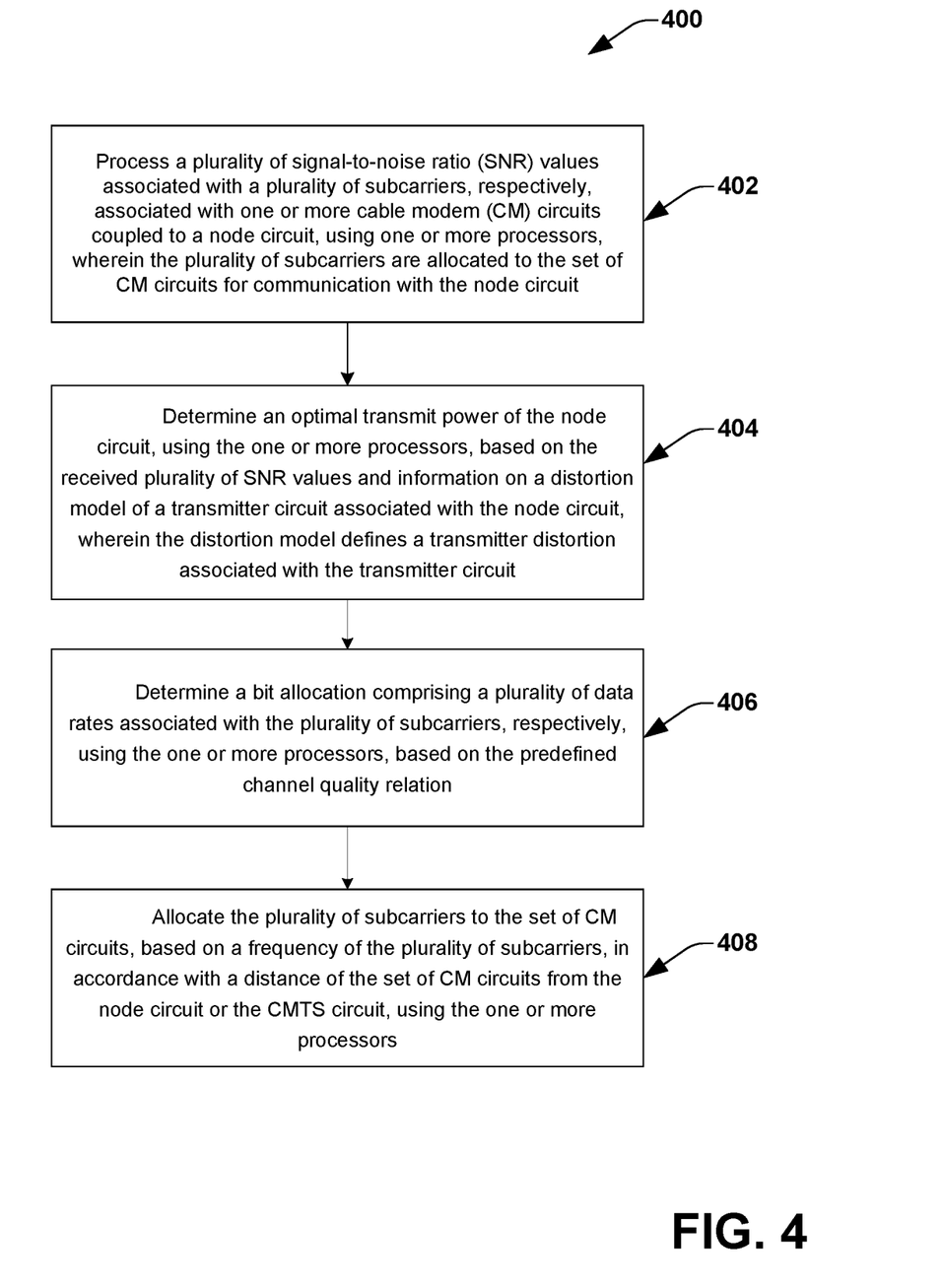
FIG. 4 illustrates a flow chart of a method of a cable modem termination system (CMTS) circuit associated with an HFC network, according to one embodiment of the disclosure.

FIG. 4 illustrates a flow chart of a method 400 of a cable modem termination system (CMTS) circuit associated with an HFC network, according to one embodiment of the disclosure. The method 400 is explained herein with reference to the apparatus 200 in FIG. 2. In some embodiments, the apparatus 200 may be included within the CMTS circuit 101 n FIG. 1. At 402, a plurality of signal-to-noise ratio (SNR) values (e.g., the plurality of SNR values 115 in FIG. 1) associated with a plurality of subcarriers, respectively, associated with a set of cable modem (CM) circuits (e.g., the set of CM circuits 104 in FIG. 1) coupled to a node circuit (e.g., the node circuit 102 in FIG. 1), is processed using one or more processors 210. In some embodiments, the plurality of subcarriers is allocated to the set of CM circuits for communication with the node circuit. In some embodiments, the plurality of SNR values is received at the one or more processors 210, from the node circuit, via the transceiver circuitry 220.

At 404, an optimal transmit power of the node circuit is determined using the one or more processors 210, based on the received plurality of SNR values and a distortion model of a transmitter circuit associated with the node circuit (e.g., based on the predefined optimal channel capacity relation in equation (5)). In some embodiments, the distortion model defines a transmitter distortion associated with the transmitter circuit. In some embodiments, the optimal transmit power of the node circuit is determined based on determining an optimal transmit power spectrum comprising a plurality of optimal subcarrier transmit power values respectively associated with the plurality of subcarriers (e.g., the plurality of optimal subcarrier transmit power values $x_{opt}^{(k)}$), based on the plurality of SNR values and the predefined optimal channel capacity relation. At 406, a bit allocation comprising a plurality of data rates associated with the plurality of subcarriers, respectively, is determined using the one or more processors 210, based on the predefined optimal channel capacity relation (in particular, based on the predefined data rate equation in equation (6) above). At 408, the plurality of subcarriers is allocated to the set of CM circuits, based on a frequency of the plurality of subcarriers, in accordance with a distance of the set of CM circuits from the node circuit, using the one or more processors 210.

Figure 5:
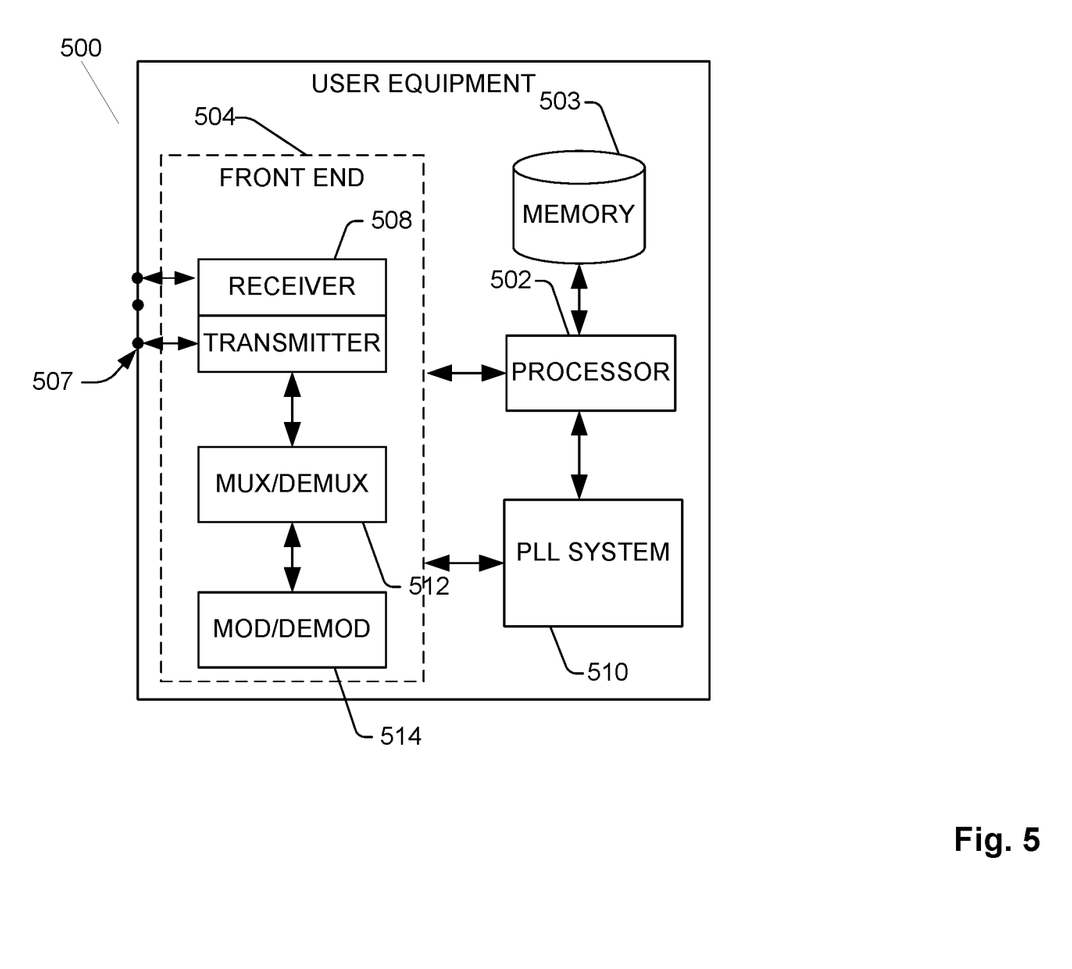
FIG. 5 illustrates a block diagram of an embodiment of device (e.g., a modem, a cable modem or gateway, etc.) related to access of a network (e.g., base station, wireless access point, femtocell access point, and so forth) that can enable and/or exploit features or aspects of the disclosed aspects.

To provide further context for various aspects of the disclosed subject matter, FIG. 5 illustrates a block diagram of an embodiment of device 500 (e.g., a modem, a cable modem or gateway, etc.) related to access of a network (e.g., base station, wireless access point, femtocell access point, and so forth) that can enable and/or exploit features or aspects of the disclosed aspects.

The device 500 can be utilized with one or more aspects (e.g., the CMTS circuit 101, the node circuit 102, and the modem circuits CM 104) of communication networks described herein according to various aspects. The user device 500, for example, comprises a digital baseband processor 502 that can be coupled to a data store or memory 503 and a front end 504 (e.g., an RF front end, an acoustic front end, an optical front end, or the other like front end). The device 500 further comprises one or more input/output ports 507 configured to receive and transmit signals to and from one or more devices such as access points, access terminals, wireless ports, routers and so forth, which can operate within a radio access network or other communication network generated via a network device (not shown).

The device 500 can be a radio frequency (RF) device for communicating RF signals, an acoustic device for communicating acoustic signals, an optical device for communicating optical signals, or any other signal communication device, such as a computer, a personal digital assistant, a mobile phone or smart phone, a tablet PC, a modem, a notebook, a router, a switch, a repeater, a PC, network device, base station or a like device that can operate to communicate with a network or other device according to one or more different communication protocols or standards.

The front end 504 can include a communication platform, which comprises electronic components and associated circuitry that provide for processing, manipulation or shaping of the received or transmitted signals via one or more receivers or transmitters (e.g. transceivers) 508, a mux/demux component 512, and a mod/demod component 514. The front end 504 is coupled to the digital baseband processor 502 and the set of input/output ports 507. The front end 504 may be configured to perform the remodulation techniques described herein to extend the frequency range of the device 500. In one aspect, the user equipment device 500 can comprise a phase locked loop system 510.

The processor 502 can confer functionality, at least in part, to substantially any electronic component within the mobile communication device 500, in accordance with aspects of the disclosure. As an example, the processor 502 can be configured to execute, at least in part, executable instructions that cause the front end to remodulate signals to selected frequencies. The processor 502 is functionally and/or communicatively coupled (e.g., through a memory bus) to memory 503 in order to store or retrieve information necessary to operate and confer functionality, at least in part, to communication platform or front end 504, the phase locked loop system 510 and substantially any other operational aspects of the phase locked loop system 510. The phase locked loop system 510 includes at least one oscillator (e.g., a VCO, DCO or the like) that can be calibrated via core voltage, a coarse tuning value, signal, word or selection process.

The processor 502 can operate to enable the mobile communication device 500 to process data (e.g., symbols, bits, or chips) for multiplexing/demultiplexing with the mux/demux component 512, or modulation/demodulation via the mod/demod component 514, such as implementing direct and inverse fast Fourier transforms, selection of modulation rates, selection of data packet formats, inter-packet times, etc. Memory 503 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a node circuit associated with a hybrid fiber coax (HFC) network, comprising an optimizer circuit configured to process a plurality of signal-to-noise ratio (SNR) values associated with a plurality of subcarriers, respectively, associated with a set of cable modem (CM) circuits coupled to the node circuit, wherein the plurality of subcarriers comprises subcarriers that are allocated to the set of CM circuits for communication with the node circuit; and determine an optimal transmit power of the node circuit, based on the plurality of SNR values and a distortion model of a transmitter circuit associated with the node circuit, wherein the distortion model defines a transmitter distortion associated with the transmitter circuit.

Example 2 is a node circuit, including the subject matter of example 1, wherein the distortion model defines the transmitter distortion associated with the transmitter circuit in terms of a total transmit power of the node circuit.

Example 3 is a node circuit, including the subject matter of examples 1-2, including or omitting elements, wherein the optimal transmit power of the node circuit is determined at the optimizer circuit based on the plurality of SNR values and a predefined optimal channel capacity relation for the node circuit that is derived in accordance with the distortion model of the transmitter circuit.

Example 4 is a node circuit, including the subject matter of examples 1-3, including or omitting elements, wherein the optimizer circuit is configured to determine the optimal transmit power of the node circuit based on determining an optimal transmit power spectrum comprising a plurality of optimal subcarrier transmit power values respectively associated with the plurality of subcarriers, based on the plurality of SNR values and the predefined optimal channel capacity relation.

Example 5 is a node circuit, including the subject matter of examples 1-4, including or omitting elements, wherein the optimal transmit power spectrum comprising the plurality of optimal subcarrier transmit power values respectively associated with the plurality of subcarriers is determined at the optimizer circuit in a way that a predefined maximum subcarrier signal-to-noise ratio (SNR) is not exceeded on each of the plurality of subcarriers.

Example 6 is a node circuit, including the subject matter of examples 1-5, including or omitting elements, wherein the optimizer circuit is further configured to determine a bit allocation comprising a plurality of data rates associated with the plurality of subcarriers, respectively, based on the predefined optimal channel capacity relation, in accordance with the determined optimal transmit power and the determined optimal transmit power spectrum.

Example 7 is a node circuit, including the subject matter of examples 1-6, including or omitting elements, further comprising a processing circuit configured to allocate the plurality of subcarriers to the set of CM circuits, based on a frequency of the plurality of subcarriers, in accordance with a distance of the set of CM circuits from the node circuit.

Example 8 is a node circuit, including the subject matter of examples 1-7, including or omitting elements, wherein the processing circuit is configured to allocate a first set of subcarriers having a first set of frequencies, respectively, to a first CM circuit of the set of CM circuits, and a second set of subcarriers having a second set of frequencies, respectively, to a second, different, CM circuit of the set of CM circuits, wherein first set of frequencies belongs to a higher frequency range relative to the second set of frequencies and wherein the first CM circuit is located closer to the node circuit with respect to the second CM circuit.

Example 9 is a node circuit associated with a hybrid fiber coax (HFC) network, comprising a processing circuit configured to allocate a plurality of subcarriers to a set of CM circuits coupled to the node circuit, wherein the plurality of subcarriers is allocated based on a frequency of the plurality of subcarriers, in accordance with a distance of the set of CM circuits from the node circuit; and an optimizer circuit configured to determine an optimal transmit power of the node circuit, based on a plurality of SNR values associated with the plurality of subcarriers, respectively and a distortion model of a transmitter circuit associated with the node circuit, wherein the distortion model defines a transmitter distortion associated with the transmitter circuit.

Example 10 is a node circuit, including the subject matter of example 9, including or omitting elements, wherein the distortion model defines the transmitter distortion associated with the transmitter circuit in terms of a total transmit power of the node circuit.

Example 11 is a node circuit, including the subject matter of examples 9-10, including or omitting elements, wherein the optimal transmit power of the node circuit is determined at the optimizer circuit based on the plurality of SNR values and a predefined optimal channel capacity relation for the node circuit that is derived in accordance with the distortion model of the transmitter circuit.

Example 12 is a node circuit, including the subject matter of examples 9-11, including or omitting elements, wherein the optimizer circuit is configured to determine the optimal transmit power of the node circuit based on determining an optimal transmit power spectrum comprising a plurality of optimal subcarrier transmit power values respectively associated with the plurality of subcarriers, based on the plurality of SNR values and the predefined optimal channel capacity relation.

Example 13 is a node circuit, including the subject matter of examples 9-12, including or omitting elements, wherein the optimizer circuit is further configured to determine a bit allocation comprising a plurality of data rates associated with the plurality of subcarriers, respectively, based on the predefined optimal channel capacity relation, in accordance with the determined optimal transmit power and the determined optimal transmit power spectrum.

Example 14 is a node circuit, including the subject matter of examples 9-13, including or omitting elements, wherein the processing circuit is configured to allocate a first set of subcarriers having a first set of frequencies, respectively, to a first CM circuit of the set of CM circuits, and a second set of subcarriers having a second set of frequencies, respectively, to a second, different, CM circuit of the set of CM circuit, wherein first set of frequencies belongs to a higher frequency range relative to the second set of frequencies and wherein the first CM circuit is located closer to the node circuit with respect to the second CM circuit.

Example 15 is a cable modem termination system (CMTS) circuit associated with a hybrid fiber coax (HFC) network, wherein the CMTS circuit is configured to couple to a node circuit over fiber, the CMTS circuit comprising a memory configured to store a plurality of instructions; and one or more processors configured to retrieve the plurality of instructions from the memory, and upon execution of the plurality of instructions is configured to process a plurality of signal-to-noise ratio (SNR) values associated with a plurality of subcarriers, respectively, associated with a set of cable modem (CM) circuits coupled to the node circuit, wherein the plurality of subcarriers comprises subcarriers that are allocated to the set of CM circuits for communication with the node circuit; and determine an optimal transmit power of the node circuit, based on the plurality of SNR values and a distortion model of a transmitter circuit associated with the node circuit, wherein the distortion model defines a transmitter distortion associated with the transmitter circuit.

Example 16 is a CMTS circuit, including the subject matter of example 15, wherein the distortion model defines the transmitter distortion associated with the transmitter circuit in terms of a total transmit power of the node circuit.

Example 17 is a CMTS circuit, including the subject matter of examples 15-16, including or omitting elements, wherein the optimal transmit power of the node circuit is determined at the one or more processors, based on the plurality of SNR values and a predefined optimal channel capacity relation for the node circuit that is derived in accordance with the distortion model of the transmitter circuit.

Example 18 is a CMTS circuit, including the subject matter of examples 15-17, including or omitting elements, wherein the one or more processors is configured to determine the optimal transmit power of the node circuit based on determining an optimal transmit power spectrum comprising a plurality of optimal subcarrier transmit power values respectively associated with the plurality of subcarriers, based on the plurality of SNR values and the predefined optimal channel capacity relation.

Example 19 is a CMTS circuit, including the subject matter of examples 15-18, including or omitting elements, wherein the one or more processors is further configured to determine a bit allocation comprising a plurality of data rates associated with the plurality of subcarriers, respectively, based on the predefined optimal channel capacity relation, in accordance with the determined optimal transmit power and the determined optimal transmit power spectrum.

Example 20 is a CMTS circuit, including the subject matter of examples 15-19, including or omitting elements, wherein the one or more processors is further configured to allocate the plurality of subcarriers to the set of CM circuits, based on a frequency of the plurality of subcarriers, in accordance with a distance of the set of CM circuits from the node circuit or from the CMTS circuit.

While the invention has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

What is claimed is:

1. A node circuit associated with a hybrid fiber coax (HFC) network, comprising:
    an optimizer circuit configured to:
        process a plurality of signal-to-noise ratio (SNR) values associated with a plurality of subcarriers, respectively, associated with a set of cable modem (CM) circuits coupled to the node circuit, wherein at least one subcarrier of the plurality of subcarriers is allocated to the set of CM circuits for communication with the node circuit; and
        determine an optimal transmit power of the node circuit, based on the plurality of SNR values and a transmitter distortion of a transmitter circuit associated with the node circuit, wherein the transmitter distortion defines a transmitter distortion associated with the transmitter circuit in terms of a total transmit power of the node circuit.

2. The node circuit of claim 1, further comprising a processing circuit configured to allocate the plurality of subcarriers to the set of CM circuits, based on a frequency of the plurality of subcarriers, in accordance with a distance of the set of CM circuits from the node circuit.

3. The node circuit of claim 1, wherein the optimal transmit power of the node circuit is determined at the optimizer circuit based on the plurality of SNR values and a predefined optimal channel capacity relation for the node circuit that is derived in accordance with the transmitter distortion of the transmitter circuit.

4. The node circuit of claim 3, wherein the optimizer circuit is configured to determine the optimal transmit power of the node circuit based on determining an optimal transmit power spectrum comprising a plurality of optimal subcarrier transmit power values respectively associated with the plurality of subcarriers, based on the plurality of SNR values and the predefined optimal channel capacity relation.

5. The node circuit of claim 3, wherein the optimal transmit power spectrum comprising the plurality of optimal subcarrier transmit power values respectively associated with the plurality of subcarriers is determined at the optimizer circuit in a way that a predefined maximum subcarrier signal-to-noise ratio (SNR) is not exceeded on each of the plurality of subcarriers.

6. The node circuit of claim 3, wherein the optimizer circuit is further configured to determine a bit allocation comprising a plurality of data rates associated with the plurality of subcarriers, respectively, based on the predefined optimal channel capacity relation, in accordance with the determined optimal transmit power and the determined optimal transmit power spectrum.

7. The node circuit of claim 6, wherein the processing circuit is configured to allocate a first set of subcarriers having a first set of frequencies, respectively, to a first CM circuit of the set of CM circuits, and a second set of subcarriers having a second set of frequencies, respectively, to a second, different, CM circuit of the set of CM circuits, wherein first set of frequencies belongs to a higher frequency range relative to the second set of frequencies and wherein the first CM circuit is located closer to the node circuit with respect to the second CM circuit.

8. A node circuit associated with a hybrid fiber coax (HFC) network, comprising:
    a processing circuit configured to allocate a plurality of subcarriers to a set of CM circuits coupled to the node circuit, wherein at least one subcarrier of the plurality of subcarriers is allocated based on a frequency of the plurality of subcarriers, in accordance with a distance of the set of CM circuits from the node circuit; and
    an optimizer circuit configured to determine an optimal transmit power of the node circuit, based on a plurality of SNR values associated with the plurality of subcarriers, respectively and a transmitter distortion of a transmitter circuit associated with the node circuit, wherein the transmitter distortion defines a transmitter distortion associated with the transmitter circuit in terms of a total transmit power of the node circuit.

9. The node circuit of claim 8, wherein the optimal transmit power of the node circuit is determined at the optimizer circuit based on the plurality of SNR values and a predefined optimal channel capacity relation for the node circuit that is derived in accordance with the transmitter distortion of the transmitter circuit.

10. The node circuit of claim 9, wherein the optimizer circuit is configured to determine the optimal transmit power of the node circuit based on determining an optimal transmit power spectrum comprising a plurality of optimal subcarrier transmit power values respectively associated with the plurality of subcarriers, based on the plurality of SNR values and the predefined optimal channel capacity relation.

11. The node circuit of claim 10, wherein the optimizer circuit is further configured to determine a bit allocation comprising a plurality of data rates associated with the plurality of subcarriers, respectively, based on the predefined optimal channel capacity relation, in accordance with the determined optimal transmit power and the determined optimal transmit power spectrum.

12. The node circuit of claim 8, wherein the processing circuit is configured to allocate a first set of subcarriers having a first set of frequencies, respectively, to a first CM circuit of the set of CM circuits, and a second set of subcarriers having a second set of frequencies, respectively, to a second, different, CM circuit of the set of CM circuit, wherein first set of frequencies belongs to a higher frequency range relative to the second set of frequencies and wherein the first CM circuit is located closer to the node circuit with respect to the second CM circuit.

13. A cable modem termination system (CMTS) circuit associated with a hybrid fiber coax (HFC) network, wherein the CMTS circuit is configured to couple to a node circuit over fiber, the CMTS circuit comprising:
a memory configured to store a plurality of instructions; and
one or more processors configured to retrieve the plurality of instructions from the memory, and upon execution of the plurality of instructions is configured to:
process a plurality of signal-to-noise ratio (SNR) values associated with a plurality of subcarriers, respectively, associated with a set of cable modem (CM) circuits coupled to the node circuit, wherein at least one subcarrier of the plurality of subcarriers comprises subcarriers that are allocated to the set of CM circuits for communication with the node circuit; and
determine an optimal transmit power of the node circuit, based on the plurality of SNR values and a transmitter distortion of a transmitter circuit associated with the node circuit, wherein the transmitter distortion defines a transmitter distortion associated with the transmitter circuit in terms of a total transmit power of the node circuit.

14. The CMTS circuit of claim 13, wherein the optimal transmit power of the node circuit is determined at the one or more processors, based on the plurality of SNR values and a predefined optimal channel capacity relation for the node circuit that is derived in accordance with the transmitter distortion of the transmitter circuit.

15. The CMTS circuit of claim 14, wherein the one or more processors is configured to determine the optimal transmit power of the node circuit based on determining an optimal transmit power spectrum comprising a plurality of optimal subcarrier transmit power values respectively associated with the plurality of subcarriers, based on the plurality of SNR values and the predefined optimal channel capacity relation.

16. The CMTS circuit of claim 15, wherein the one or more processors is further configured to determine a bit allocation comprising a plurality of data rates associated with the plurality of subcarriers, respectively, based on the predefined optimal channel capacity relation, in accordance with the determined optimal transmit power and the determined optimal transmit power spectrum.

17. The CMTS circuit of claim 13, wherein the one or more processors is further configured to allocate the plurality of subcarriers to the set of CM circuits, based on a frequency of the plurality of subcarriers, in accordance with a distance of the set of CM circuits from the node circuit or from the CMTS circuit.

* * * * *